Patented July 15, 1924.

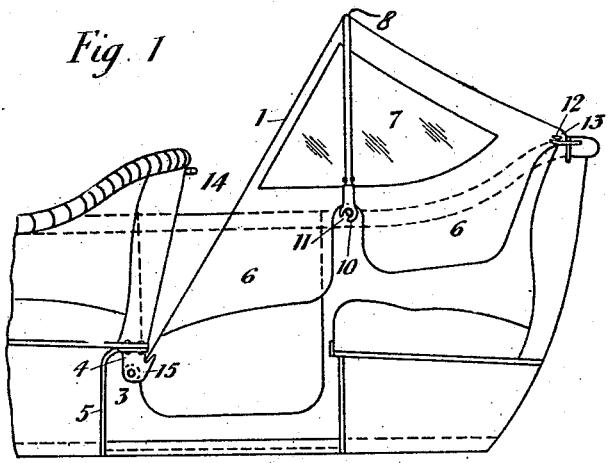
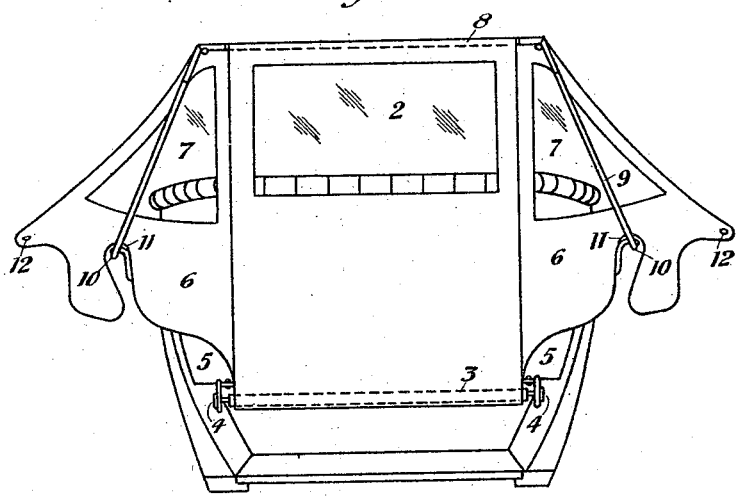
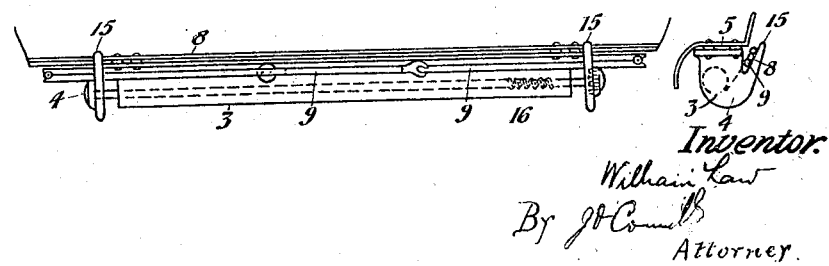

1,501,406

UNITED STATES PATENT OFFICE.

WILLIAM LAW, OF MANCHESTER, ENGLAND.

WINDSCREEN FOR MOTOR VEHICLES.

Application filed May 11, 1922. Serial No. 560,207.

*To all whom it may concern:*

Be it known that I, WILLIAM LAW, a subject of the King of Great Britain and Ireland, residing at 41 Fulford Street, Old Trafford, Manchester, in the county of Lancaster, England, have invented new and useful Improvements in and Relating to Windscreens for Motor Vehicles, of which the following is a specification.

These improvements relate to windscreens for motor vehicles, which wind screens are particularly applicable for use for screening passengers seated in the rear seats of a motor car, or in the seats of char-a-bancs, and have for their object the provision of a windscreen with side extensions which will be easily fixed in position when required and will be easily moved out of the way of passengers when not required by the passengers themselves without the necessity of rising from their seats. Further features of the improvements are that the side extensions of the windscreen may be easily and quickly moved out of the way to allow of the entrance to or exit from the rear seats, passengers, with easy and rapid replacement by the passengers after being seated, or after dismounting from the vehicle.

In carrying the improvements into effect I provide a flexible windscreen to shield the passengers from wind or dust the said screen being provided with flexible side extensions formed integral therewith. The lower edge of the windscreen is attached to a spring roller and the upper edge to a collapsible frame with means for removably supporting said frame upon the vehicle. The side extensions are provided with fastening means by which they may be removably secured at the rear of the passengers' seats thus providing side screens for the passengers and assisting to maintain the whole screen and frame in position. The whole construction is such that on detaching the side extension securing means, folding the said extensions across the wind screen front portion, and collapsing the frame, the whole flexible screen will fold up around the spring roller the members of the supporting frame all lying parallel to the said roller. A socket is provided on either side of the back of the front seat of the motor car to receive the lower or free end of one of the pivoted side rods for a purpose to be hereinafter explained.

The improvements will now be fully described with reference to the accompanying drawings, wherein:—

Figure 1 is a side elevation of the rear part of a car with the wind screen in operative position, only one of the side extensions, that on the "off side" being shown.

Figure 2 is an elevation of the screen as seen by a passenger seated in one of the rear seats, for whose protection the screen is provided;

Figure 3 shows the spring roller in front and end elevation.

Referring to Figures 1 and 2, 1 is the front portion of the windscreen hereinafter referred to as the windscreen, which may be composed of any suitable flexible and impervious material, such as rubber, cloth, twill, or the like. It is provided with a light 2, (Figure 2) which may be square or of any other convenient form and which light is of celluloid so that it will present no obstacle to the rolling up of the screen when required upon the spring roller 3 to which its lower edge is attached. This spring roller is, as will be seen carried by brackets 4, secured by bolts to the toe panel 5, 6, 6, are side extensions which are formed integrally with the front windscreen 1, and are provided with celluloid lights 7, 7. The upper horizontal edge of the front windscreen is secured by any suitable means upon a rod 8, which may be solid or tubular, and to the extremities of this rod 8 are pivoted the dependent side rods 9, 9, each of which terminates in a bifurcated clip 10, to allow them to rest upon the supporting pins 11, 11, attached to the side of the vehicle. The side extensions are preferably of the form shown in the figures and are provided at their rearmost points with eyelets 12, 12, by which they may be removably secured upon hooks formed on hook plates 13, 13, placed on either side of the vehicle.

It will be seen that when the whole windscreen with side extensions are in position as shown in Figures 1 and 2, a perfect screening effect is attained as the transverse rod 8 with the side rods 9, 9, form a three sided frame or support for the windscreen 1 whilst the securing of the two side extensions 6, 6, by means of their eyelets 12, 12, at the rear end and the attachment of the lower edge of the windscreen 1 to the roller effectually prevents movement in any direction of the screen or side extension 8 or of the frame rods 8, 9, 9. To lower the screen it is only necessary to detach the eyelets 12, 12, from the hook plates 13, 13, fold the said side extensions inwards upon the outer front face of the front screen 1. The side rods 10, 10, are then lifted from the supports 11 and folded over upon the transverse bar 8. The whole screen will then, when released, roll in, the spring roller 3 winding the whole of the windscreen fabric upon itself, and allow the screen to roll in on to the roller, while allowing the transverse frame to rotate the side rods 10, 10, until the frame rests on the top of front seat back frame. The transverse rod 8 then lies parallel with the spring roller 3 and the side rods 9, 9, the pivot ends of which have descended with the rod 8, may be laid parallel with the rod 8 and with the spring roller. There is thus a minimum of space occupied by the screen and its accessories when in the folded and "out of use" position.

If, when the screen and side extensions are in the operative position as shown in the Figures 1 and 2, and it is necessary to allow a passenger to enter or dismount from the rear seats, the rod 8 on that side is lifted from its support 11 and the side extension 6 on that side is detached from the hook plate 13. The bifurcated end of the side rod 9 is then placed for support in one of the sockets 14 fixed to the rear of the seat in front. This does not effect the support of the windscreen and the side extension on the further side in any way, as the whole screen is still supported by its frame 8, 9, 9, the front screen 1 being at an angle to its usual position. The passenger is then free to enter; to replace the end of the side rod 9 upon its support 11; and to secure again the eyelet 12 upon the hook plate 13, after taking his seat.

Preferably the spring roller is constructed as shown in Figure 3 of the drawings, two brackets being bolted to the toe panel as shown, one at each side of the vehicle to support the spring roller 3, each of the said brackets being formed with an extension member 15 within the transverse frame rod 8 and 9, 9, rests when the screen and side extensions are rolled upon the roller, 16 indicates the roller spring. The rod 8 and the side rods 9, 9, all lying parallel to the roller 3 as shown (the windscreen fabric being omitted for clearness) give easy hand hold for the drawing up of the windscreen from the roller and for speedily placing in position of the forked ends of the side rods 9 upon their supports 11, 11, with subsequent securing of the side extensions by means of eyelets 12, 12 and hook plates, 13, 13.

Although I have described the improvements as applicable to windscreens for use in connection with the rear seats of motor vehicles, it will be obvious that their use is not confined to such seats. A windscreen constructed as described may equally well be applied to a side car of a motor cycle, its compactness and the absence of any retaining means for the screen, other than the eyelets and hook plates 12 and 13 making the screen particularly applicable to such side cars. Further, the improved windscreen may be applied to the front seat of a motor vehicle in lieu of the glass adjustable screen now commonly in use. For such use, sockets such as 14 may be provided at any convenient position.

I claim:—

1. A windscreen for the seats of motor vehicles, said wind screen comprising a front screen and side extensions of flexible material, a spring roller to which the lower end of the front screen is attached and on which the screen and side extensions are adapted to be wound, a supporting frame for the windscreen comprising a transverse rod secured to the upper horizontal edge thereof with side rods pivoted to the said transverse rod, and supporting means on the sides of the vehicle whereon the side rods may be loosely stepped, and means for detachably securing the end of each side extension at the rear of the seats being protected, these latter securing means with the spring rollers serving to keep the collapsible supporting frame and front screen and extensions in operative position.

2. For use in connection with a windscreen having the features claimed in claim 1, socket devices, secured forward of the apparatus, in each of which sockets one of the side rods of the collapsible frame may be loosely stepped when the windscreen is in position and exit from or entrance to the protected seats is desired.

3. In a windscreen adapted to be rolled upon a spring roller mounted in side brackets, and having a collapsible frame as claimed in claim 1, extension pieces on the said brackets to receive the transverse rod of the collapsible frame and the side rods of said frame—the said side rods being laid parallel to the said transverse rod—when the fabric of the windscreen is rolled upon the roller.

In testimony whereof I have hereunto set my hand at Manchester, England, this 13th day of April, 1922.

WILLIAM LAW.